(12) United States Patent
Pearce

(10) Patent No.: US 11,276,408 B2
(45) Date of Patent: *Mar. 15, 2022

(54) PASSIVE ENROLLMENT METHOD FOR SPEAKER IDENTIFICATION SYSTEMS

(71) Applicant: INTEL CORPORATION, Santa Clara, CA (US)

(72) Inventor: David Pearce, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/356,011

(22) Filed: Mar. 18, 2019

(65) Prior Publication Data
US 2019/0214021 A1 Jul. 11, 2019

Related U.S. Application Data

(63) Continuation of application No. 15/988,710, filed on May 24, 2018, now Pat. No. 10,236,001, which is a (Continued)

(51) Int. Cl.
*G10L 17/04* (2013.01)
*G10L 17/22* (2013.01)
(Continued)

(52) U.S. Cl.
CPC .............. *G10L 17/04* (2013.01); *G10L 15/04* (2013.01); *G10L 15/05* (2013.01); *G10L 17/22* (2013.01); *G10L 2015/088* (2013.01)

(58) Field of Classification Search
CPC ......... G10L 15/04; G10L 15/05; G10L 15/22; G10L 2015/088; G10L 17/04; G10L 17/22
See application file for complete search history.

(56) References Cited

U.S. PATENT DOCUMENTS 4,363,102 A  12/1982  Holmgren et al.
6,219,639 B1  4/2001  Bakis et al.
(Continued)

OTHER PUBLICATIONS

United States Patent and Trademark Office, "Office Action," issued in connection with U.S. Appl. No. 15/988,710 dated Aug. 8, 2018, 17 pages.

(Continued)

*Primary Examiner* — Eric Yen
(74) *Attorney, Agent, or Firm* — Hanley, Flight & Zimmerman, LLC

(57) ABSTRACT

Techniques for passive enrollment of a user in a speaker identification (ID) device are provided. One technique includes: parsing, by a processor of the speaker ID device, a speech sample, spoken by the user, into a keyword phrase sample and a command phrase sample; identifying, by a text-dependent speaker ID circuit of the speaker ID device, the user as the speaker of the keyword phrase sample; associating the command phrase sample with the identified user; determining if the command phrase sample in conjunction with one or more earlier command phrase samples associated with the user is sufficient command phrase sampling to enroll the user in a text-independent speaker ID circuit of the speaker ID device; and enrolling the user in the text-independent speaker ID circuit using the command phrase samples associated with the user after determining there is sufficient command phrase sampling to enroll the user.

17 Claims, 5 Drawing Sheets

Related U.S. Application Data continuation of application No. 15/457,738, filed on Mar. 13, 2017, now Pat. No. 9,990,926.

(51) Int. Cl.
  *G10L 15/04* (2013.01)
  *G10L 15/05* (2013.01)
  *G10L 15/08* (2006.01)

(56) References Cited

U.S. PATENT DOCUMENTS

| | | | |
|---|---|---|---|
| 6,424,946 B1* | 7/2002 | Tritschler | G06K 9/6226 704/272 |
| 6,434,520 B1* | 8/2002 | Kanevsky | G10L 15/26 704/243 |
| 6,480,825 B1 | 11/2002 | Sharma et al. | |
| 6,535,848 B1 | 3/2003 | Ortega et al. | |
| 6,697,779 B1 | 2/2004 | Bellegarda et al. | |
| 7,295,970 B1 | 11/2007 | Gorin et al. | |
| 7,567,903 B1* | 7/2009 | Goffin | G10L 15/12 704/234 |
| 8,244,532 B1 | 8/2012 | Begeja et al. | |
| 9,257,133 B1 | 2/2016 | Strand | |
| 9,318,107 B1 | 4/2016 | Sharifi | |
| 9,318,114 B2 | 4/2016 | Zeljkovic et al. | |
| 9,319,504 B2 | 4/2016 | Schroeter | |
| 9,398,367 B1 | 7/2016 | Scott et al. | |
| 9,548,979 B1* | 1/2017 | Johnson | H04L 63/0861 |
| 9,600,231 B1 | 3/2017 | Sun et al. | |
| 9,607,612 B2 | 3/2017 | Deleeuw | |
| 9,633,661 B1 | 4/2017 | Typrin et al. | |
| 9,711,148 B1* | 7/2017 | Sharifi | G10L 17/24 |
| 9,772,994 B2 | 9/2017 | Karov et al. | |
| 9,837,069 B2 | 12/2017 | Shamir et al. | |
| 9,990,926 B1 | 6/2018 | Pearce | |
| 10,127,224 B2 | 11/2018 | Deleeuw | |
| 10,217,458 B2 | 2/2019 | Mangalath et al. | |
| 10,236,001 B2 | 3/2019 | Pearce | |
| 10,540,975 B2 | 1/2020 | Begum et al. | |
| 10,642,881 B2 | 5/2020 | Singh et al. | |
| 10,972,682 B1* | 4/2021 | Muenster | H04N 5/272 |
| 2002/0116190 A1* | 8/2002 | Rockenbeck | G10L 15/065 704/250 |
| 2003/0046068 A1* | 3/2003 | Perronnin | G10L 15/07 704/220 |
| 2005/0114141 A1 | 5/2005 | Grody | |
| 2007/0106517 A1* | 5/2007 | Cluff | G10L 17/10 704/273 |
| 2008/0059156 A1* | 3/2008 | Han | G10L 15/08 704/207 |
| 2008/0281600 A1 | 11/2008 | Kuppuswamy et al. | |
| 2011/0251843 A1* | 10/2011 | Aronowitz | G06N 7/005 704/235 |
| 2013/0137401 A1 | 5/2013 | Begeja et al. | |
| 2014/0163978 A1 | 6/2014 | Basye et al. | |
| 2014/0195236 A1 | 7/2014 | Hosom et al. | |
| 2015/0100313 A1 | 4/2015 | Sharma | |
| 2015/0149163 A1 | 5/2015 | VanBlon et al. | |
| 2016/0077794 A1* | 3/2016 | Kim | G06F 3/167 704/275 |
| 2016/0104483 A1* | 4/2016 | Foerster | G10L 25/03 704/275 |
| 2016/0179831 A1 | 6/2016 | Gruber et al. | |
| 2016/0283185 A1 | 9/2016 | McLaren et al. | |
| 2016/0329051 A1* | 11/2016 | Rajapakse | G10L 15/28 |
| 2016/0372117 A1 | 12/2016 | Klose et al. | |
| 2017/0025125 A1* | 1/2017 | Alvarez Guevara | G10L 17/04 |
| 2017/0039751 A1 | 2/2017 | Tong et al. | |
| 2017/0083285 A1* | 3/2017 | Meyers | G10L 15/26 |
| 2017/0176965 A1* | 6/2017 | Martin Lloret | H02J 3/381 |
| 2017/0177716 A1 | 6/2017 | Perez et al. | |
| 2017/0213190 A1 | 7/2017 | Hazan | |
| 2018/0108351 A1* | 4/2018 | Beckhardt | G06F 3/167 |
| 2018/0277121 A1 | 9/2018 | Pearce | |
| 2018/0286411 A1* | 10/2018 | Nakadai | G01S 3/8006 |
| 2018/0349354 A1 | 12/2018 | Gonzalez et al. | |
| 2020/0051306 A1 | 2/2020 | Park et al. | |

OTHER PUBLICATIONS

United States Patent and Trademark Office, "Notice of Allowance," issued in connection with U.S. Appl. No. 15/988,710 dated Oct. 31, 2018, 5 pages.

United States Patent and Trademark Office, "Office Action," issued in connection with U.S. Appl. No. 15/457,738 dated Oct. 26, 2017, 13 pages.

United States Patent and Trademark Office, "Notice of Allowance," issued in connection with U.S. Appl. No. 15/457,738 dated Feb. 5, 2018, 5 pages.

* cited by examiner

PASSIVE ENROLLMENT METHOD FOR SPEAKER IDENTIFICATION SYSTEMS

CROSS-REFERENCE TO RELATED APPLICATION

This application is a continuation of U.S. application Ser. No. 15/988,710 filed on May 24, 2018 (now U.S. Pat. No. 10,236,001), which is a continuation of U.S. application Ser. No. 15/457,738 filed on Mar. 13, 2017 (now U.S. Pat. No. 9,990,926), the entire contents of all of which are herein incorporated by reference.

BACKGROUND

Text-independent speaker identification (ID) systems, such as systems that identify a particular person that is talking and without depending on specific text to identify the person, require sufficient duration of user speech to train them, such as one minute or more of speech. Users do not have the patience to spend the time enrolling (e.g., speaking for the purpose of training the system to recognize their voice) on these systems. In addition, the style of speaking during an artificial enrollment session may be different than during normal use, leading to lower performance from the speaker ID system.

DETAILED DESCRIPTION

Figure 1:
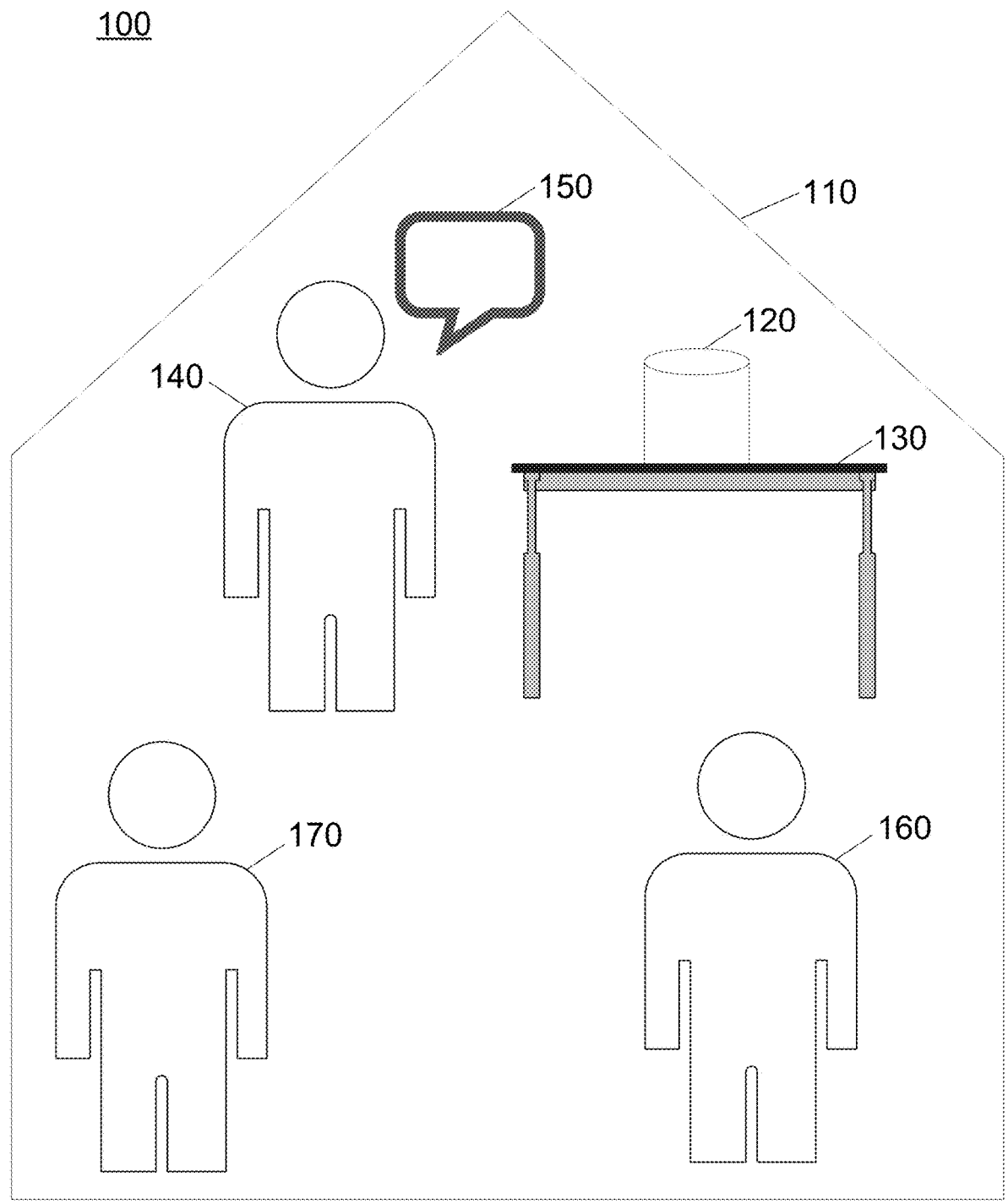
FIG. 1 is a schematic diagram illustrating an example environment for passive enrollment of a speaker identification (speaker ID) system, according to an embodiment of the present disclosure.

One or more embodiments of the present disclosure are directed towards voice and speech recognition in general, and more particularly to passive enrollment methods for text-independent speaker identification and verification systems. Techniques for passive enrollment of a user in a speaker identification (speaker ID) device are provided. One technique includes: parsing, by a processor of the speaker ID device, a speech sample, spoken by the user, into a keyword phrase sample and a command phrase sample; identifying, by a text-dependent speaker ID circuit of the speaker ID device, the user as the speaker of the keyword phrase sample; associating the command phrase sample with the identified user; determining if the command phrase sample in conjunction with one or more earlier command phrase samples associated with the user is sufficient command phrase sampling to enroll the user in a text-independent speaker ID circuit of the speaker ID device; and enrolling the user in the text-independent speaker ID circuit using the command phrase samples associated with the user after determining there is sufficient command phrase sampling to enroll the user in the text-independent speaker ID circuit.

General Overview

Speaker identification (speaker ID) systems identify a speaker (e.g., the identification or ID of a person who is speaking, or at least a characteristic or criterion to distinguish the speaker from another speaker) from among several possible known speakers. Speaker ID systems can work, for example, by analyzing portions of a person's speech, comparing the portions or analyses to known samples or characteristics of speech from the group of known people or speakers, and categorizing the portions or analyses into one of the known speakers. Speaker ID systems can use, for example, machine learning (e.g., with one or more computer processors) to accomplish this identification. Example machine learning techniques include support vector machines, Gaussian mixture models, deep learning (e.g., using neural networks), hidden Markov models, iVectors, to name a few. The learning includes an enrollment (or training) period during which a person is added to a set or database of known speakers by analyzing specific samples of speech known to have come from that person. During the enrollment (which may be, for example, one or more minutes, such as two or three minutes, of normal speech from the person), characteristics (e.g., qualities, signatures, distinctive features) are identified and saved by the system (for example, in a database on a nonvolatile storage system, such as a disk drive or a solid-state drive) for later retrieval and comparison with new samples of speech that may come from the person.

In active enrollment, the speakers are identified to the system and provide speech samples for the specific or primary purpose of enrollment (such as having the speakers read aloud specific passages provided to them). However, many people are reluctant to take part in active enrollment (e.g., because of time, inclination, opportunity, or other reasons), and those that do take part in active enrollment may not speak in their natural voice. For instance, some speakers may speak more formally (such as more slowly, more deliberately, or more precisely) during an active enrollment session, which makes such a trained speaker ID system less accurate at identifying the speaker when the speaker talks in their natural voice.

In identified enrollment, the speech samples are identified to the system as coming from particular speakers. For example, in call center conversations, the call center agent may identify a particular caller or expressly ask the caller to identify themself. Further, with telephone calls, the caller's identity may be presumed based on the known (or presumed) telephone number from which they are calling (e.g., caller ID, directory lookup). However, such techniques are generally limited to call center environments. In addition, call center agents can make mistakes, callers are not always consistent when they identify themselves, and different people can call from the same telephone number. Further, such techniques break down when there are numerous speakers on the same call or using the same microphone.

Thus, one or more embodiments of the present disclosure use passive enrollment for a speaker ID system. With passive enrollment, there is no active enrollment process. Rather, the user (perhaps unknowingly) provides speech for an activity other than enrollment, and samples of this speech are collected and used for enrollment. With passive enrollment, the enrollment takes place, for example, as part of normal speech by the person being enrolled (e.g., speech whose specific or primary purpose is separate from that of enrollment in the speaker ID system). When a sufficient amount of such speech is accumulated for a particular speaker (e.g., one minute or more, such as two or three minutes, of normal speech), the speaker can be enrolled in the speaker ID system. Further, in one or more embodiments of the present disclosure, the identity of the speaker being enrolled is known, but not by being expressly identified or presumed as discussed above, but rather by performing a text-dependent speaker identification from a set of known speakers using a keyword or words (as may be used address an electronic voice assistant) that make up part of every speech sample used to enroll the speakers in the speaker ID system. In one or more embodiments of the present disclosure, there may be numerous speakers communicating, and their speech samples may be in an arbitrary order. Accordingly, one or more embodiments of the present disclosure segregate the speech samples by particular speaker using a text-dependent identification of the keyword or keyword phrase, and enroll each speaker using their corresponding speech samples as part of the passive enrollment process.

In one or more embodiments of the present disclosure, passive enrollment is streamlined by using a certain keyword or words (e.g., text dependent) to segregate the speech samples collected during passive enrollment. For example, when using smart speaker (or smart audio) technology, such as a home speech assistant (e.g., Amazon Echo, which responds to the keyword "Alexa"—Amazon, Echo, and Alexa, alone and in combinations, are all registered trademarks of Amazon.com, Inc), a particular keyword (or words) is used to make requests or statements to the assistant. Accordingly, the keyword is part of all, most, or some of the speech samples collected during the passive enrollment. As a particular word or words (in this case, the keyword or keyword phrase) is easier to use to segregate speakers, the speech samples are segregated based on their corresponding keywords using a text-dependent speaker ID system (e.g., trained using one or more samples, such as three or five samples, of the keyword phrase spoken by each of the speakers who need to be enrolled in the text-independent speaker ID system). Once a sufficient quantity of sampled speech (e.g., about one minute or more, such as two or three minutes) is accumulated for a particular speaker, the accumulated speech samples can be used to enroll the speaker in the text-independent speaker ID system.

This is in comparison to other techniques such as active enrollment, where speakers subject themselves to an active enrollment period, supplying a sample of speech (e.g., one minute or so) for the primary purpose of enrollment, along with their identity. The system then analyzes and characterizes the speech sample and associates this analysis with the identity of the speaker so that the speaker can be identified in future speech samples. Active enrollment has a number of drawbacks, such as getting speakers to take part in the active enrollment (e.g., time, overhead, commitment) and the loss in accuracy resulting from most people not talking normally or naturally when having to speak in artificial settings, such as reading specific text aloud for purposes of speaker recognition and identification.

Accordingly, one or more embodiments of the present disclosure are directed to using keyword segregation to assist passive enrollment for speaker identification and verification technology. Some embodiments of the present disclosure are directed towards smart (audio) speaker technology, such as an electronic personal assistant, speech assistant products in the home, including a home voice assistant, a home personal assistant, and a home speech assistant (e.g., Amazon Echo). In one or more embodiments of the present disclosure, a speaker keyword or words (such as "Alexa" or "Hey Alexa") is used to wake or activate an electronic personal assistant, together with a corresponding statement, request, or other command phrase (e.g., immediately after the keyword or keyword phrase). Any number of such wake-words, wake-phrases, initial greetings, or other trigger-language can be used for the keyword sample, as will be appreciated in light of this disclosure, and will be generally referred to as the "keyword" or "keyword phrase." Still other embodiments of the present disclosure are directed towards smartphones, meeting rooms, and other voice assistants (e.g., robots, such as robots trained to work with different people).

Some embodiments of the present disclosure are directed to a combination of text-dependent speaker identification or verification (e.g., speaker ID) on a keyword, to label speech that is used for enrollment of a text-independent speaker ID system. Some embodiments of the present disclosure are directed to Amazon Echo-like home assistant technologies as well as home robotics with voice interface. Some embodiments can be implanted in silicon; other embodiments can be implemented in firmware. Some embodiments can be implemented as part of a system on a chip (SoC), such as a processor for understanding speech or for voice recognition.

According to some embodiments of the present disclosure, a method for passive enrollment of a text-independent speaker ID system is provided, where the speech needed for training is collected automatically (e.g., in the background, or for a primary purpose other than speaker recognition or identification, such as to receive a request from a speaker) and without the need for an explicit or active enrollment of the text-independent speaker ID system. This is in contrast to other techniques for passive enrollment, such as for telephony and call centers or other telephone communications, which use recordings from call center or other telephone conversations (that can be specifically identified to a particular speaker) for enrollment. Such techniques obtain the identity of the talker, for example, from their telephone number or after the call center agent confirms the identity of the person. While these approaches are applicable to the call center environment, or telephone calls, they are not applicable or suitable to environments where there are many people using the same system or multiple users of the same microphone, such as with a home speech assistant or home voice assistant, for example, Amazon Echo or similar products.

In one embodiment of the present disclosure, the training data for the speaker ID system is collected from the users' interactions with a speech assistant (such as an electronic speech assistant or similar technology). Current such systems can make use of a keyword followed by a command phrase that is the query to the speech assistant, e.g., "Alexa, what's the weather today?" If there is only one person using the system, then the system does not need to identify the speaker, but when multiple people use the same device the speech from each person needs to be tagged (or otherwise identified or labeled or segregated) as coming from the same person in order for the system to be able differentiate its responses (e.g., personalize, build from previous requests, etc.) based on earlier interactions with the same person. For example, in one or more embodiments of the present disclosure, speakers to be enrolled in such a speech assistant first do a text-dependent enrollment of a speaker ID system using the keyword phrase (e.g., one or more spoken samples, such as three or five samples, of the keyword or keyword phrase).

In one or more embodiments of the present disclosure, a text-dependent speaker ID circuit or device is used to identify the speaker of a speech sample based on the keyword phrase contained in the speech sample. Put another way, a text-dependent speaker identification or verification is performed on the keyword detection, e.g., identifying the speaker based on their pronunciation of the keyword(s). The speaker verification provided from the keyword is used to label the speech sample containing the keyword as coming from a specific person. Such a text-dependent speaker ID system may be trained using, for example, only one, two, or three such samples of the keyword for each speaker being enrolled. The text-dependent speaker ID system can acquire sufficient characteristics to distinguish one speaker from another, based on the keyword samples (such as three or more) provided by each of the speakers to be enrolled in the speaker ID system. This allows the keyword/command phrase combinations to be distinguished or segregated between the different speakers.

Once the text-dependent speaker ID component has been trained, passive mode text-independent enrollment takes place, using the corresponding command phrases (having identified them to a particular speaker as part of the text-dependent speaker identification) as examples of text-independent speech samples for enrollment. For example, a typical command phrase may be about 3 seconds, so it will take about 20 such keyword/command phrase interactions (20×3 seconds=60 seconds=1 minute) with the system to collect enough material to train a text-independent speaker verification system (for each user).

In summary, by collecting keyword/command phrase samples, roughly 20 per user (depending on factors such as the length and variety of the command phrases), the speaker ID system is capable of using passive enrollment to arrive at a text-independent speaker identification and verification system capable of identifying or verifying a speaker from a sample of their speech, regardless of the content of the sample. In further detail, by using a keyword enrollment period, roughly three or more keyword samples per user (depending on factors such as the length and distinctness of the keyword or keywords), the user does a text-dependent speaker ID enrollment (enough to identify or verify a keyword as being spoken by a particular person) first. This is used to segregate the speech samples by speaker, followed by a text-independent speaker ID enrollment—enough to identify or verify any spoken text as belonging to a particular person—using some or all of the corresponding command phrases that accompany the keyword phrase for the particular person.

One or more embodiments of the present disclosure fit naturally with the way that electronic personal assistants (such as in the home) are currently used (e.g., keyword and command phrase structure, with many people sharing the same system). By first learning to identify speakers based on their pronunciations of the keywords (e.g., text dependent), then associating or segregating the corresponding command phrases with the identified speakers, and then completing the learning based on the corresponding command phrases (e.g., text independent), one or more embodiments of the present disclosure enable a passive enrollment system for a home personal assistant-like model shared by numerous users in a common setting.

FIG. 1 is a schematic diagram illustrating an example environment 100 for passive enrollment of a speaker ID system 120, according to an embodiment of the present disclosure. The environment 100 includes a house or home 110 for enclosing the occupants, equipment, and furniture, along with the electronic speaker ID system 120 sitting on a table 130. The speaker ID system (or device) 120 uses a passive enrollment method for learning to identify different speakers, such as occupants 140, 160, and 170 of the house 110. For example, when one of the occupants, say speaker 140, utters a keyword/command phrase (or command or phrase or speech sample) 150 (such as "Alexa, what is the square root of 173?"), the device 120 learns to recognize and identify speaker 140 using the command 150 and other such commands, phrases, or speech samples. An example of such a technique is described in further detail with reference to FIGS. 2-4.

Figure 2:
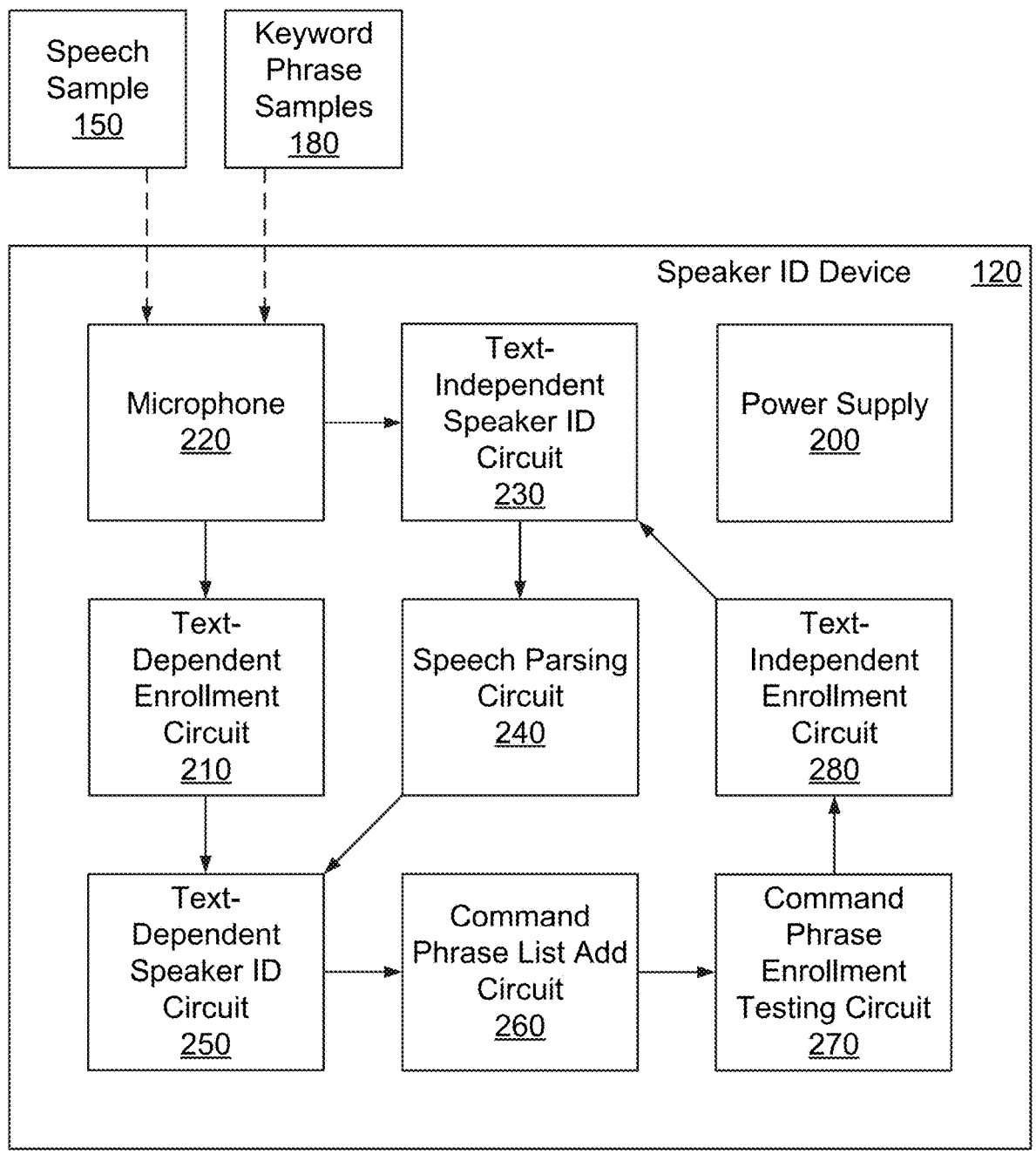
FIG. 2 is a block diagram illustrating an example speaker ID device for speaker identification of a speech sample, according to an embodiment of the present disclosure.

FIG. 2 is a block diagram illustrating an example passive enrollment speaker ID device 120 for speaker identification of a speech sample 150, according to an embodiment of the present disclosure. The device 120 uses a microphone (or microphone array) 220 to sense speech (such as the speech sample 150 or speech signal recording, which may include samples 180 of the keyword phrase) uttered by a speaker (such as speaker 140 of FIG. 1) interacting with the speaker ID device 120, a text-dependent enrollment circuit 210 to enroll each speaker in a text-dependent speaker ID circuit 250 based on their pronunciation of the keyword phrase (using several such samples per speaker), a text-independent speaker ID circuit 230 to maintain a set of enrolled speakers (e.g., those speakers with sufficient speech samples to have been enrolled in the text-independent speaker ID circuit 230) and to perform a text-independent identification of the speaker of the speech sample 150 from the set of enrolled speakers, and a speech parsing circuit 240 to parse the speech sample 150 into a keyword phrase sample and a command phrase sample (as part of enrolling the speaker into the text-independent speaker ID circuit 230) when the text-independent speaker ID circuit 230 is unable to identify the speaker from the set of enrolled speakers.

The speaker ID device 120 further includes the text-dependent speaker ID circuit 250 to use the keyword phrase sample to perform a text-dependent identification of the speaker from a set of speakers using the speaker ID device 120 who enrolled in the text-dependent speaker ID circuit 250, and a command phrase list add circuit 260 to generate an identifying label (based on the speaker identification of the keyword phrase sample) and insert the label and command phrase sample in a list of unenrolled command phrase samples (e.g., those command phrase samples whose corresponding speakers have not been enrolled in the set of enrolled speakers) when the text-independent speaker ID circuit 230 is unable to identify the speaker from the set of enrolled speakers. By way of example, the list of unenrolled command phrase samples may be sorted or indexed by the corresponding identifying labels so that the command phrase samples from the same speaker are adjacent or contiguous in the list (or other data structure for the unenrolled command phrase samples). In other embodiments, the command phrase list add circuit 260 associates the speaker with the command phrase sample in other ways (e.g., maintaining a separate linked list of command phrase samples for each speaker).

The speaker ID device 120 further includes a command phrase enrollment testing circuit 270 to see if a sufficient number of command phrase samples (e.g., 20, 30, 40, or more) or a sufficient amount of command phrase sampling (e.g., one minute, two minutes, three minutes, or more) has been obtained from the speaker (e.g., share the same identifying label) to enroll the speaker in the text-independent speaker ID circuit 230, and a text-independent enrollment circuit 280 to enroll the speaker in the text-independent speaker ID circuit 230 using the accumulated command phrase samples from the speaker, to add the speaker to the set of enrolled speakers, and to remove the corresponding command phrase samples of the speaker from the list of unenrolled command phrase samples. The speaker ID device 120 further includes a power supply 200 to supply electric power to the microphone 220 and each of the logic circuits 210 and 230 through 280.

Methodology

Figure 3:
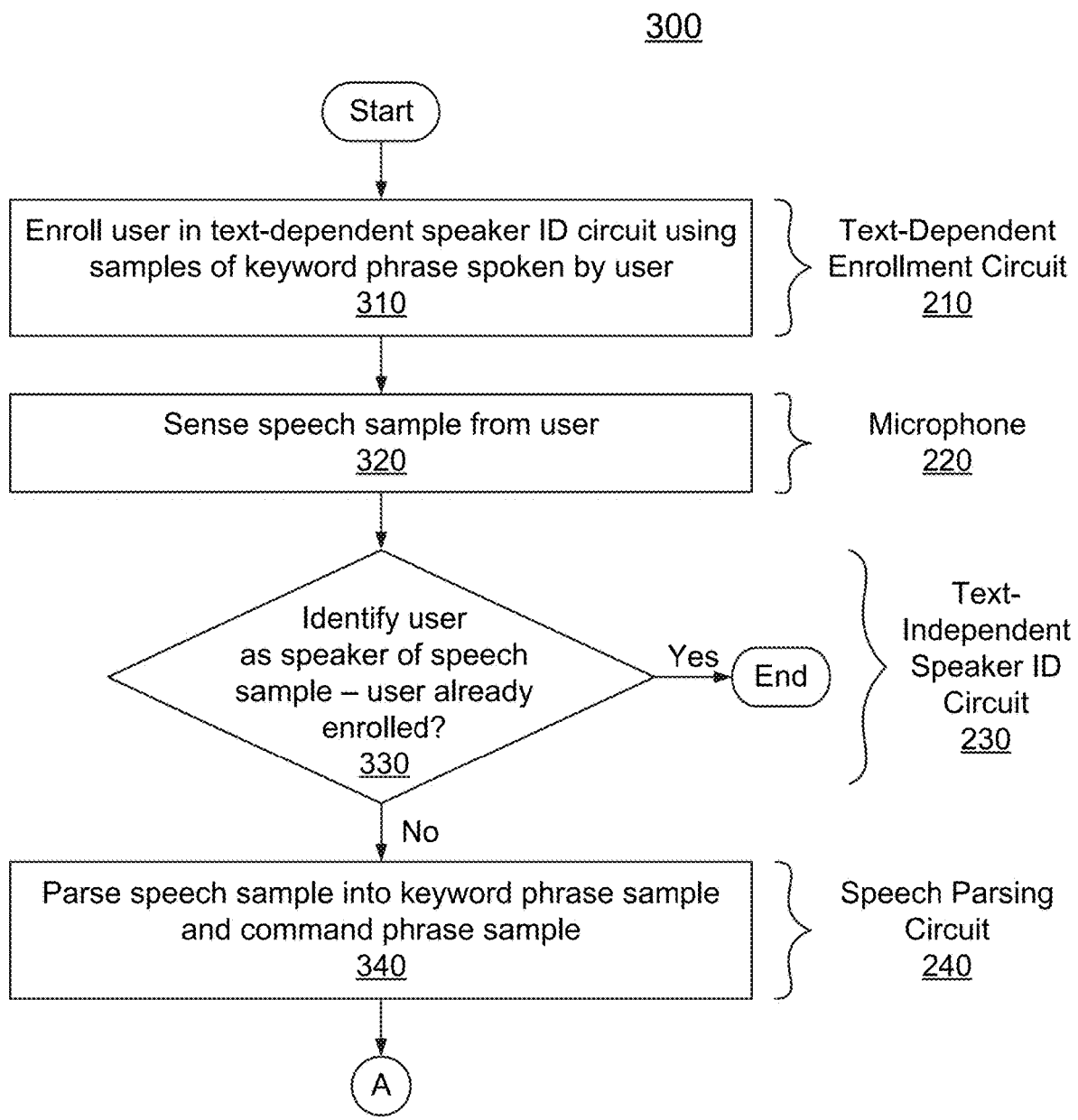
FIGS. 3-4 is a flowchart illustrating an example passive enrollment method for text-independent speaker identification, according to an embodiment of the present disclosure.
Figure 4:
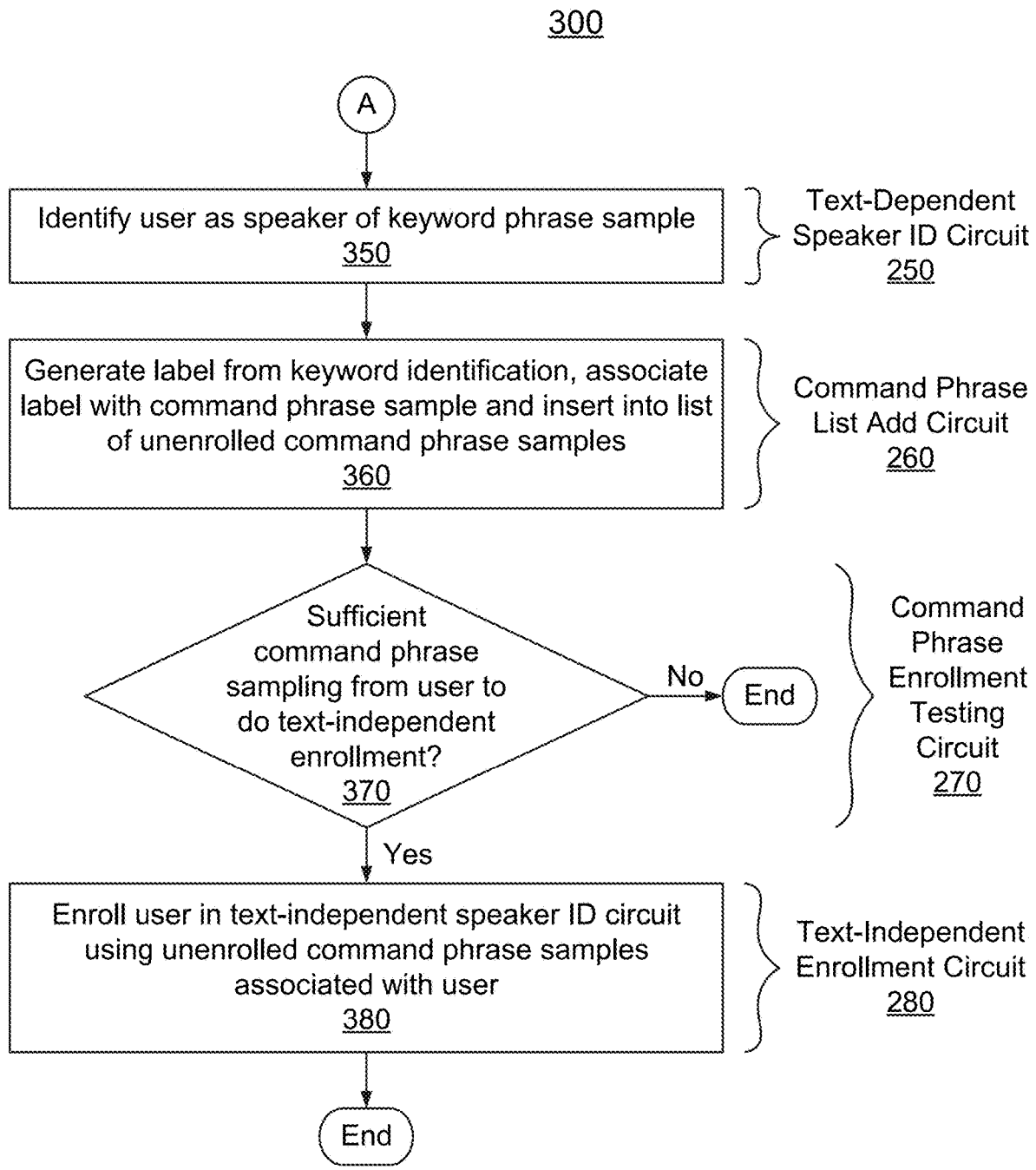

FIGS. 3-4 is a flowchart illustrating an example passive enrollment method 300 for text-independent speaker identification, according to an embodiment of the present disclosure. As may be seen, example method 300 includes several phases and sub-processes, the sequence of which may vary from one embodiment to another. However, when considered in the aggregate, these phases and sub-processes form a process for passive enrollment of a text-independent speaker identification system or device in accordance with some of the embodiments disclosed herein. These embodiments may be implemented, for example, using the system architecture illustrated in FIG. 2 as described above.

However, other system architectures may be used in other embodiments, as will be apparent in light of this disclosure. To this end, the correlation of the various functions shown in FIGS. 3-4 to the specific components illustrated in the other figures is not intended to imply any structural or use limitations. Rather, other embodiments may include, for example, varying degrees of integration where multiple functionalities are effectively performed by one system. For example, in an alternative embodiment, a single module may be used to perform all the functions of method 300. Thus, other embodiments may have fewer or more modules or sub-modules depending on the granularity of implementation. In still other embodiments, the methodology depicted may be implemented as a computer program product including one or more non-transitory machine readable mediums that when executed by one or more processors (e.g., computer processors, such as a microprocessor) cause the methodology to be carried out. Numerous variations and alternative configurations will be apparent in light of this disclosure.

When a user interacts with a speech assistant (such as Amazon Echo) they say a keyword or words (e.g., "Alexa" or "Hey Alexa") followed by a command phrase (for example, "What's the weather here tomorrow?") A recording of the utterance (or speech sample) is stored in the system. The speech sample is parsed (for example, using speech recognition techniques such as keyword spotting and voice activity detection) into a keyword phrase (e.g., keyword or words at the beginning of the speech sample) and a command phrase (such as remaining words at the end of the speech sample). In other embodiments, the keyword phrase may be anywhere in the speech sample. Text-dependent speaker verification is performed on the keyword phrase. This generates a label for who the talker is. This label is used to tag the associated command phrase and it is saved to some form of storage, such as a nonvolatile storage device (e.g., magnetic disk or solid-state drive). As different people use the system, recordings of their labeled utterances are similarly saved to storage.

When there are enough utterances or speech samples from a particular talker saved then these are used to train a text-independent speaker ID model for that talker. In some embodiments, there are one or more further checks that the quality of the training utterances is sufficient in terms of factors such as variety of training utterances, duration of training material, and signal quality (e.g., noise level) of speech samples. Once all the users (or a subset of the talkers) have been trained then text-independent speaker ID can be performed on any speech that is collected at the device microphones (more generally, speaker identification is performed not only when the user addresses the speech assistant but also at any other time that the user speaks and a sample of the speech is supplied to the speaker ID system).

In other embodiments, the text-independent speaker verification is used to support other services as part of the overall speech assistant capability. By way of example, in one embodiment, a service that uses the text-independent speaker verification is future smart home applications, where there are multiple Amazon Echo-like puck devices in the home. For proactive information delivery (e.g., having the system answer from the closest device) it is useful to know which device is closest to the person the message is intended for so that the message is only spoken from that device and it does not disturb other people in the house in other rooms. In such an embodiment, each time someone speaks the text-independent speaker ID enables the system to detect who that person is and the device that is the closest to them. Based on that together with some analytics and input from other sensors like proximity detectors or door detectors it can build a model for where each person is in the home.

In an embodiment of the present disclosure, a given speech recording is analyzed for a leading keyword portion (e.g., "Hey Alexa"), followed by a corresponding command phrase (e.g., command, statement, or question). The keyword portion is the text-dependent speaker identification or verification. The command phrase is saved to a data store, which is a set of paired elements: speaker labels (as identified by their keyword phrases) and commands (command phrases). For example, the set includes a first speaker label and a corresponding command, a second speaker label and a corresponding second command, etc., with one speaker label and one corresponding command phrase from each of the interactions.

The speaker labels are identified to particular speakers, such as being put into correspondence with the different speakers (e.g., based on the values of the speaker labels). The method then selects files (or entries or pairs of labels and commands) from the same talker (e.g., all the entries from the same speaker, such as having the same label or almost the same label). When a sufficient number of entries (or quantity of time) from the same speaker is assembled, the entries are input to a text independent speaker ID training system, which learns how to recognize the speaker from the provided commands.

In an embodiment of the present disclosure, a consistency check is added to see if the voice used to speak the keyword is the same as the voice speaking the command phrase. This helps lessen the chance that the wrong voice is identified with the command phrase.

Referring to FIGS. 3-4, in general, and specifically to FIG. 3, in method 300, passive enrollment of a user in a speaker ID device takes place. Processing begins, and in operation 310, the user is enrolled (e.g., by the text-dependent enrollment circuit 210 of FIG. 2) in a text-dependent speaker ID circuit using samples (such as three or more) of the keyword phrase spoken by the user. In some embodiments, the other users of the speaker ID device are also enrolled in the text-dependent speaker ID circuit at this time. In some embodiments, only one or two samples of the keyword phrase are provided by each of the users being enrolled in the text-dependent speaker ID circuit.

In operation 320, a speech sample (or utterance) of a speaker is sensed (e.g., by the microphone or microphone array 220 of FIG. 2). In operation 330, the speech sample is analyzed by a text-independent speaker identifier (such as a machine learning circuit or the text-independent speaker ID circuit 230 of FIG. 2), which may identify the speaker (such as being a member of a set of enrolled speakers) if the speaker has already been enrolled and the speech sample matches that of the enrolled speaker. However, if the speaker is not recognized (e.g., not enrolled), then in operation 340, the speech sample is parsed into a keyword phrase sample and a command phrase sample (e.g., by a speech recognition circuit or the speech parsing circuit 240 of FIG. 2).

Referring to FIG. 4, in operation 350, the keyword phrase sample is analyzed by a text-dependent speaker identifier (e.g., by another machine learning circuit or the text-dependent speaker ID circuit 250 of FIG. 2), which identifies the user (who has already been enrolled in the text-dependent speaker identifier) as the speaker of the keyword phrase sample. In operation 360, an identifying label (such as an identity returned by the text-dependent speaker identifier) is generated, and the identifying label and the command phrase sample are inserted into a list of unenrolled command phrase samples (e.g., by the command phrase list add circuit 260 of FIG. 2). The list of unenrolled command phrase samples may be sorted or otherwise arranged or indexed by the corresponding labels (or the respective speakers otherwise associated with their corresponding command phrase samples) such that command phrase samples by the same speaker are contiguous or adjacent to each other in the list. This can make it relatively straightforward to determine how many keyword command phrase samples or how much command phrase sampling belongs to the same speaker.

In operation 370, the number of command phrase samples coming from the user is determined (e.g., by the command phrase enrollment testing circuit 270 of FIG. 2), and if a sufficient number (such as 20, 30, or more) of such samples or a sufficient amount (such as one minute, two minutes, or more) of such sampling has not been obtained, then processing ends for this speech sample. However, if a sufficient amount of command phrase sampling has been obtained, processing proceeds with operation 380, where text-independent enrollment of the user is performed (e.g., by the text-independent enrollment circuit 280) using the accumulated command phrase samples belonging to the user. The user is also added to the set of enrolled speakers and the user's corresponding command phrase samples are deleted from the list of unenrolled command phrase samples. In some embodiments, the user's command phrase samples are saved for possible future use (e.g., re-enrolling the user with a larger set of command phrase samples). At this point, further speech samples by the user will be identified by the text-independent speaker identification circuit as coming from the user and without need to actively enroll the user. This ends the processing for the current speech sample.

Example System

Figure 5:
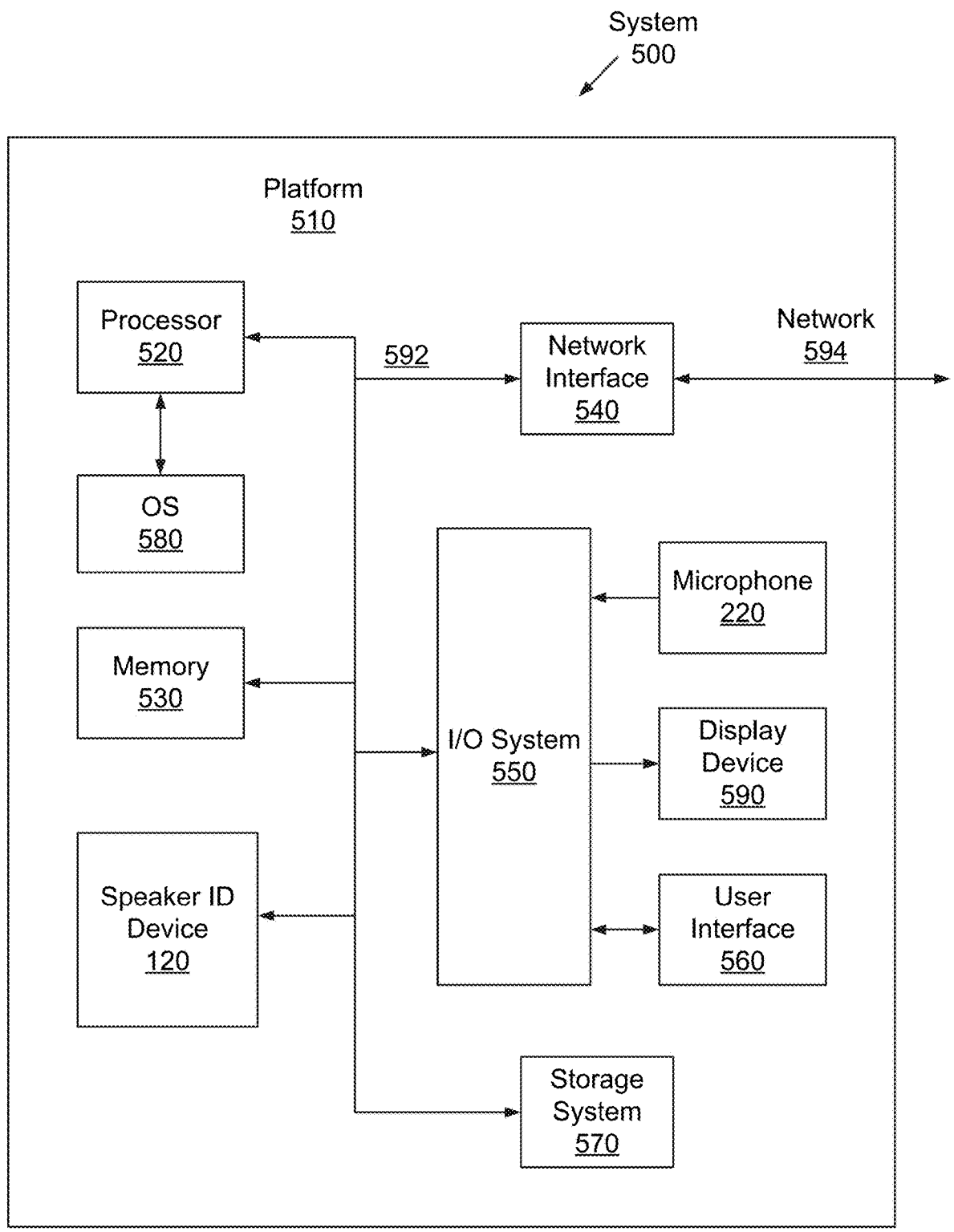
FIG. 5 is a block diagram illustrating an example computing system configured with the speaker ID device shown in FIG. 2, according to an embodiment of the present disclosure.

FIG. 5 is a block diagram illustrating an example computing system 500 configured with the speaker ID device 120 of FIG. 2, according to an embodiment of the present disclosure. In some embodiments, system 500 includes a platform 510 that may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart tablet, smart speaker), mobile internet device (MID), messaging device, data communication device, television (TV), smart TV, TV receiver/converter or set top box, and so forth. Any combination of different devices may be used in some embodiments.

In some embodiments, platform 510 may include any combination of a processor 520, memory 530, speaker ID device 120, network interface 540, input/output (I/O) system 550, microphone 220, display device 590, user interface 560, and storage system 570. As may be further seen, a bus or interconnect 592 is also provided to allow for communication between the various components listed above or other components not shown. Platform 510 may be coupled to a network 594 through network interface 540 to allow for communications with other computing devices, platforms, or resources. Other componentry and functionality not reflected in the block diagram of FIG. 5 will be apparent in light of this disclosure, and it will be appreciated that other embodiments are not limited to any particular hardware configuration.

Processor 520 may be any suitable processor, and may include one or more coprocessors or controllers, such as an audio processor or a graphics processing unit, to assist in control and processing operations associated with system 500. In some embodiments, the processor 520 may be implemented as any number of processor cores. The processor (or processor cores) may be any type of processor or central processing unit (CPU), such as, for example, a micro-processor, an embedded processor, a digital signal processor (DSP), a graphics processor (GPU), a network processor, a field programmable gate array, or other device configured to execute code. The processors may be multi-threaded cores in that they may include more than one hardware thread context (or "logical processor") per core. Processor 520 may be implemented as a complex instruction set computer (CISC) or a reduced instruction set computer (RISC) processor. In some embodiments, processor 520 may be configured as an x86 instruction set compatible processor.

In some embodiments, the disclosed techniques for passive enrollment of speaker ID device 120 may be implemented in a parallel fashion, where tasks may be distributed across multiple CPU/GPU cores or other cloud based resources to enable real-time processing from image capture to display.

Memory 530 may be implemented using any suitable type of digital storage including, for example, flash memory or random access memory (RAM). In some embodiments, the memory 530 may include various layers of memory hierarchy or memory caches. Memory 530 may be implemented as a volatile memory device such as, but not limited to, a RAM, dynamic RAM (DRAM), or static RAM (SRAM) device. Storage system 570 may be implemented as a non-volatile storage device such as, but not limited to, one or more of a hard disk drive (HDD), a solid-state drive (SSD), a universal serial bus (USB) drive, an optical disk drive, a tape drive, an internal storage device, an attached storage device, flash memory, battery backed-up synchronous DRAM (SDRAM), and a network accessible storage device. In some embodiments, storage 570 may include technology to increase the storage performance enhanced protection for valuable digital media when multiple hard drives are included.

Processor 520 may be configured to execute an Operating System (OS) 580 that may include any suitable operating system, such as Google Android (Google Inc., Mountain View, Calif.), Microsoft Windows (Microsoft Corp., Redmond, Wash.), Apple OS X (Apple Inc., Cupertino, Calif.), or Linux. As will be appreciated in light of this disclosure, the techniques provided herein may be implemented without regard to the particular operating system provided in conjunction with system 500, and therefore may also be implemented using any suitable existing or subsequently-developed platform.

Network interface circuit 540 may be any appropriate network chip or chipset which allows for wired or wireless connection between other components of computer system 500 or network 594, thereby enabling system 500 to communicate with other local or remote computing systems, servers, and cloud-based servers or resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, or Near Field Communication (NFC). Example wireless networks include, but are not limited to, wireless local area networks, wireless personal area networks, wireless metropolitan area networks, cellular networks, and satellite networks.

I/O system 550 may be configured to interface between various I/O devices and other components of computer system 500. I/O devices may include, but not be limited to, microphone 220, display device 590, user interface 560, and other devices not shown such as a keyboard, mouse, and speaker, etc.

It will be appreciated that in some embodiments, the various components of the system 500 may be combined or integrated in a system-on-a-chip (SoC) architecture. In some embodiments, the components may be hardware components, firmware components, software components, or any suitable combination of hardware, firmware, or software.

Speaker ID device 120 is configured to be trained by passive enrollment techniques to identify speakers by their voice commands uttered into microphone 220. These techniques include enrolling users (speakers) in a text-dependent speaker ID system based on their pronunciations of the keyword phrase, receiving speech samples from the users (speakers), parsing the speech samples into corresponding keyword phrase samples and command phrase samples, identifying the speakers of the command phrase samples based on the speakers of their corresponding keyword phrase samples (using the text-dependent speaker ID system), then using the corresponding command phrase samples to enroll the speakers in text-independent speaker ID device 120. Speaker ID device 120 may include any or all of the components illustrated in FIGS. 2-4, as described above.

Speaker ID device 120 may be implemented or otherwise used in conjunction with a variety of suitable software or hardware that is coupled to or that otherwise forms a part of platform 510. Speaker ID device 120 may additionally or alternatively be implemented or otherwise used in conjunction with user I/O devices that may provide information to, and receiving information and commands from, a user. These I/O devices may include devices collectively referred to as user interface 560. In some embodiments, user interface 560 may include a textual input device such as a keyboard, and a pointer-based input device such as a mouse. Other input/output devices that may be used in other embodiments include a touchscreen, a touchpad, a microphone (such as microphone 220), and a speaker. Still other input/output devices may be used in other embodiments. Further examples of user input may include gesture or motion recognition and facial tracking.

In some embodiments, speaker ID device 120 may be installed local to system 500, as shown in the example embodiment of FIG. 5. In other embodiments, system 500 may be implemented in a client-server arrangement where at least some functionality associated with these circuits is provided to system 500 using an applet, such as a JavaScript applet, or another downloadable module. Such a remotely accessible module or sub-module may be provisioned in real-time, in response to a request from a client computing system for access to a given server having resources that are of interest to the user of the client computing system. In such embodiments, the server may be local to network 594 or remotely coupled to network 594 by one or more other networks or communication channels. In some cases, access to resources on a given network or computing system may require credentials such as usernames, passwords, or compliance with any other suitable security mechanism.

In various embodiments, system 500 may be implemented as a wireless system, a wired system, or a combination of both. When implemented as a wireless system, system 500 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 500 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs), programmable logic devices, digital signal processors, field-programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other.

For example, some embodiments may be described using the terms "connected" or "coupled" to indicate that two or more elements are in direct physical or electrical contact with each other. The term "coupled," however, may also mean that two or more elements are not in direct contact with each other, yet still cooperate or interact with each other.

The various embodiments disclosed herein may be implemented in various forms of hardware, software, firmware, or special purpose processors. For example, in one embodiment at least one non-transitory computer readable storage medium has instructions encoded thereon that, when executed by one or more processors, cause one or more of the 3D reconstruction methodologies disclosed herein to be implemented. The instructions may be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions may be provided in the form of one or more computer software applications or applets that are tangibly embodied on a memory device, and that may be executed by a computer having any suitable architecture.

In one embodiment, the system may be hosted on a given website and implemented, for example, using JavaScript or another suitable browser-based technology. For instance, in some embodiments, the system may leverage processing resources provided by a remote computer system accessible via network 594. In other embodiments, the functionalities disclosed herein may be incorporated into other software applications, such as virtual reality applications, gaming applications, entertainment applications, or other video processing applications.

The computer software applications disclosed herein may include any number of different modules, sub-modules, or other components of distinct functionality, and may provide information to, or receive information from, still other components. These modules may be used, for example, to communicate with input or output devices such as a display screen, a touch sensitive surface, a printer, or any other suitable device. Other componentry and functionality not reflected in the illustrations will be apparent in light of this disclosure, and it will be appreciated that other embodiments are not limited to any particular hardware or software configuration. Thus, in other embodiments, system 500 may include additional, fewer, or alternative subcomponents as compared to those included in the embodiment of FIG. 5.

The non-transitory computer readable medium may be any suitable medium for storing digital information, such as a hard drive, a server, a flash memory, or random access memory (RAM), or a combination of memories. In alternative embodiments, the components or modules disclosed herein may be implemented with hardware, including gate level logic such as a field-programmable gate array (FPGA), or alternatively, a purpose-built semiconductor such as an application-specific integrated circuit (ASIC). Still other embodiments may be implemented with a microcontroller having one or more input/output ports for receiving and outputting data, and one or more embedded routines for carrying out the various functionalities disclosed herein. It will be apparent that any suitable combination of hardware, software, and firmware may be used, and that other embodiments are not limited to any particular system architecture.

Some embodiments may be implemented, for example, using a machine readable medium or article which may store an instruction or a set of instructions that, if executed by a machine, may cause the machine to perform a method or operations in accordance with the embodiments. Such a machine may include, for example, any suitable processing platform, computing platform, computing device, processing device, computing system, processing system, computer, process, or the like, and may be implemented using any suitable combination of hardware and software.

The machine readable medium or article may include, for example, any suitable type of memory unit, memory device, memory article, memory medium, storage device, storage article, storage medium, or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, or interpreted programming language.

Unless specifically stated otherwise, it may be appreciated that terms such as "processing," "computing," "calculating," "determining," or the like refer to the action or process of a computer or computing system, or similar electronic computing device, that manipulates or transforms data represented as physical quantities (for example, electronic) within the registers or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may include, for example, singly or in any combination, hardwired circuitry, programmable circuitry such as computer processors including one or more individual instruction processing cores, state machine circuitry, or firmware that stores instructions executed by programmable circuitry. The circuitry may include a processor or controller configured to execute one or more instructions to perform one or more operations described herein. The instructions may be embodied as, for example, an application, software, firmware, etc., configured to cause the circuitry to perform any of the operations. Software may be embodied as a software package, code, instructions, instruction sets, or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets, or data that are hard-coded (e.g., nonvolatile) in memory devices.

The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGA), logic gates, registers, semiconductor device, chips, microchips, chip sets, and so forth.

Numerous specific details have been set forth herein to provide a better understanding of the embodiments. It will be understood in light of the present disclosure, however, that the embodiments may be practiced without these specific details. In other instances, well known operations, components, and circuits have not been described in detail so as not to obscure the embodiments. It may be appreciated that the specific structural and functional details disclosed herein may be representative and do not necessarily limit the scope of the embodiments. In addition, although the subject matter has been described in language specific to structural features or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for passive enrollment of a user in a speaker identification (ID) device. The method includes: parsing, by a processor of the speaker ID device, a speech sample, spoken by the user, into a command phrase sample and a sample of a keyword phrase; identifying, by a text-dependent speaker ID circuit of the speaker ID device, the user as the speaker of the keyword phrase sample; associating, by the processor, the command phrase sample with the identified user; determining, by the processor, if the command phrase sample in conjunction with one or more earlier command phrase samples associated with the user is sufficient command phrase sampling to enroll the user in a text-independent speaker ID circuit of the speaker ID device; and enrolling, by the processor, the user in the text-independent speaker ID circuit using the command phrase samples associated with the user after the determining there is sufficient command phrase sampling to enroll the user in the text-independent speaker ID circuit.

Example 2 includes the subject matter of Example 1, further including enrolling, by the processor, the user in the text-dependent speaker ID circuit using one or more samples of the keyword phrase spoken by the user.

Example 3 includes the subject matter of Example 2, further including enrolling, by the processor, one or more other users in the text-dependent speaker ID circuit using a corresponding one or more samples of the keyword phrase spoken by each of the other users.

Example 4 includes the subject matter of any of Examples 1 through 3, further including sensing, by a microphone of the speaker ID device, the speech sample being uttered as a command to the speaker ID device from the user.

Example 5 includes the subject matter of any of Examples 1 through 4, further including identifying, by the text-independent speaker ID circuit, the user as the speaker of a second speech sample spoken by the user after the enrolling of the user in the text-independent speaker ID circuit.

Example 6 includes the subject matter of any of Examples 1 through 5, further including: parsing, by the processor, another speech sample, spoken by another user, into another keyword phrase sample and another command phrase sample; identifying, by the text-dependent speaker ID circuit, the other user as the speaker of the other keyword phrase sample; associating, by the processor, the other command phrase sample with the identified other user; determining, by the processor, if the other command phrase sample in conjunction with one or more earlier command phrase samples associated with the other user is sufficient command phrase sampling to enroll the other user in the text-independent speaker ID circuit; and enrolling, by the processor, the other user in the text-independent speaker ID circuit using the command phrase samples associated with the other user after the determining there is sufficient command phrase sampling to enroll the other user.

Example 7 includes the subject matter of Example 6, further including identifying, by the text-independent speaker ID circuit, the other user as the speaker of yet another speech sample spoken by the other user after the enrolling of the other user in the text-independent speaker ID circuit.

Example 8 includes the subject matter of any of Examples 1 through 7, where the sufficient command phrase sampling includes at least one minute of speech in the command phrase samples associated with the user.

Example 9 includes the subject matter of any of Examples 1 through 8, where the sufficient command phrase sampling includes at least 20 of the command phrase samples associated with the user.

Example 10 includes the subject matter of any of Examples 1 through 9, where the keyword phrase is one of a greeting, a wake word, or a wake phrase.

Example 11 is a speaker identification (ID) device for passive enrollment of a user. The device includes: a speech parsing circuit to parse a speech sample, spoken by the user, into a command phrase sample and a sample of a keyword phrase; a text-dependent speaker ID circuit to identify the user as the speaker of the keyword phrase sample; a command phrase association circuit to associate the command phrase sample with the identified user; a command phrase enrollment testing circuit to determine if the command phrase sample in conjunction with one or more earlier command phrase samples associated with the user is sufficient command phrase sampling to enroll the user in a text-independent speaker ID circuit of the speaker ID device; and a text-independent enrollment circuit to enroll the user in the text-independent speaker ID circuit using the command phrase samples associated with the user after the command phrase enrollment testing circuit determines there is sufficient command phrase sampling to enroll the user in the text-independent speaker ID circuit.

Example 12 includes the subject matter of Example 11, further including a text-dependent enrollment circuit to enroll the user in the text-dependent speaker ID circuit using one or more samples of the keyword phrase spoken by the user.

Example 13 includes the subject matter of Example 12, where the text-dependent enrollment circuit is further to enroll one or more other users in the text-dependent speaker ID circuit using a corresponding one or more samples of the keyword phrase spoken by each of the other users.

Example 14 includes the subject matter of any of Examples 11 through 13, further including a microphone to sense the speech sample being uttered as a command to the speaker ID device from the user.

Example 15 includes the subject matter of any of Examples 11 through 14, where the text-independent speaker ID circuit is to identify the user as the speaker of a second speech sample spoken by the user after the user is enrolled in the text-independent speaker ID circuit.

Example 16 includes the subject matter of any of Examples 11 through 15, where: the speech parsing circuit is further to parse another speech sample, spoken by another user, into another keyword phrase sample and another command phrase sample; the text-dependent speaker ID circuit is further to identify the other user as the speaker of the other keyword phrase sample; the command phrase association circuit is further to associate the other command phrase sample with the identified other user; the command phrase enrollment testing circuit is further to determine if the other command phrase sample in conjunction with one or more earlier command phrase samples associated with the other user is sufficient command phrase sampling to enroll the other user in the text-independent speaker ID circuit; and the text-independent enrollment circuit is further to enroll the other user in the text-independent speaker ID circuit using the command phrase samples associated with the other user after the command phrase enrollment testing circuit determines there is sufficient command phrase sampling to enroll the other user.

Example 17 includes the subject matter of Example 16, where the text-independent speaker ID circuit is further to identify the other user as the speaker of yet another speech sample spoken by the other user after the other user is enrolled in the text-independent speaker ID circuit.

Example 18 includes the subject matter of any of Examples 11 through 17, where the sufficient command phrase sampling includes at least one minute of speech in the command phrase samples associated with the user.

Example 19 includes the subject matter of any of Examples 11 through 18, where the sufficient command phrase sampling includes at least 20 of the command phrase samples associated with the user.

Example 20 includes the subject matter of any of Examples 11 through 19, where the keyword phrase is one of a greeting, a wake word, or a wake phrase.

Example 21 is at least one non-transitory computer readable storage medium having instructions encoded thereon that, when executed by one or more processors, result in the following operations for passive enrollment of a user in a speaker identification (ID) device being performed. The operations include: parsing a speech sample, spoken by the user, into a command phrase sample and a sample of a keyword phrase; identifying, by a text-dependent speaker ID circuit of the speaker ID device, the user as the speaker of the keyword phrase sample; associating the command phrase sample with the identified user; determining if the command phrase sample in conjunction with one or more earlier command phrase samples associated with the user is sufficient command phrase sampling to enroll the user in a text-independent speaker ID circuit of the speaker ID device; and enrolling the user in the text-independent speaker ID circuit using the command phrase samples associated with the user after the determining there is sufficient command phrase sampling to enroll the user in the text-independent speaker ID circuit.

Example 22 includes the subject matter of Example 21, the operations further including enrolling the user in the text-dependent speaker ID circuit using one or more samples of the keyword phrase spoken by the user.

Example 23 includes the subject matter of Example 22, the operations further including enrolling one or more other users in the text-dependent speaker ID circuit using a corresponding one or more samples of the keyword phrase spoken by each of the other users.

Example 24 includes the subject matter of any of Examples 21 through 23, the operations further including sensing, by a microphone of the speaker ID device, the speech sample being uttered as a command to the speaker ID device from the user.

Example 25 includes the subject matter of any of Examples 21 through 24, the operations further including identifying, by the text-independent speaker ID circuit, the user as the speaker of a second speech sample spoken by the user after the enrolling of the user in the text-independent speaker ID circuit.

Example 26 includes the subject matter of any of Examples 21 through 25, the operations further including: parsing another speech sample, spoken by another user, into another keyword phrase sample and another command phrase sample; identifying, by the text-dependent speaker ID circuit, the other user as the speaker of the other keyword phrase sample; associating the other command phrase sample with the identified other user; determining if the other command phrase sample in conjunction with one or more earlier command phrase samples associated with the other user is sufficient command phrase sampling to enroll the other user in the text-independent speaker ID circuit; and enrolling the other user in the text-independent speaker ID circuit using the command phrase samples associated with the other user after the determining there is sufficient command phrase sampling to enroll the other user.

Example 27 includes the subject matter of Example 26, the operations further including identifying, by the text-independent speaker ID circuit, the other user as the speaker of yet another speech sample spoken by the other user after the enrolling of the other user in the text-independent speaker ID circuit.

Example 28 includes the subject matter of any of Examples 21 through 27, where the sufficient command phrase sampling includes at least one minute of speech in the command phrase samples associated with the user.

Example 29 includes the subject matter of any of Examples 21 through 28, where the sufficient command phrase sampling includes at least 20 of the command phrase samples associated with the user.

Example 30 includes the subject matter of any of Examples 21 through 29, where the keyword phrase is one of a greeting, a wake word, or a wake phrase.

Example 31 is a system for passive enrollment of a user in a speaker identification (ID) device. The system includes: means for parsing a speech sample, spoken by the user, into a command phrase sample and a sample of a keyword phrase; means for identifying the user as the speaker of the keyword phrase sample; means for associating the command phrase sample with the identified user; means for determining if the command phrase sample in conjunction with one or more earlier command phrase samples associated with the user is sufficient command phrase sampling to enroll the user in a text-independent speaker ID circuit of the speaker ID device; and means for enrolling the user in the text-independent speaker ID circuit using the command phrase samples associated with the user after the determining there is sufficient command phrase sampling to enroll the user in the text-independent speaker ID circuit.

Example 32 includes the subject matter of Example 31, further including means for enrolling the user in a text-dependent speaker ID circuit of the speaker ID device using one or more samples of the keyword phrase spoken by the user.

Example 33 includes the subject matter of Example 32, further including means for enrolling one or more other users in the text-dependent speaker ID circuit using a corresponding one or more samples of the keyword phrase spoken by each of the other users.

Example 34 includes the subject matter of any of Examples 31 through 33, further including means for sensing the speech sample being uttered as a command to the speaker ID device from the user.

Example 35 includes the subject matter of any of Examples 31 through 34, further including means for identifying the user as the speaker of a second speech sample spoken by the user after the enrolling of the user in the text-independent speaker ID circuit.

Example 36 includes the subject matter of any of Examples 31 through 35, further including: means for parsing another speech sample, spoken by another user, into another keyword phrase sample and another command phrase sample; means for identifying the other user as the speaker of the other keyword phrase sample; means for associating the other command phrase sample with the identified other user; means for determining if the other command phrase sample in conjunction with one or more earlier command phrase samples associated with the other user is sufficient command phrase sampling to enroll the other user in the text-independent speaker ID circuit; and means for enrolling the other user in the text-independent speaker ID circuit using the command phrase samples associated with the other user after the determining there is sufficient command phrase sampling to enroll the other user.

Example 37 includes the subject matter of Example 36, further including means for identifying the other user as the speaker of yet another speech sample spoken by the other user after the enrolling of the other user in the text-independent speaker ID circuit.

Example 38 includes the subject matter of any of Examples 31 through 37, where the sufficient command phrase sampling includes at least one minute of speech in the command phrase samples associated with the user.

Example 39 includes the subject matter of any of Examples 31 through 38, where the sufficient command phrase sampling includes at least 20 of the command phrase samples associated with the user.

Example 40 includes the subject matter of any of Examples 31 through 39, where the keyword phrase is one of a greeting, a wake word, or a wake phrase.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood in light of the present disclosure. The present disclosure should therefore be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method comprising:
    parsing a first user speech sample associated with a user into a first wake phrase sample and a first command phrase sample;
    assigning an identification label to the first command phrase sample based on an identification of the user, the identification of the user using information based on the first wake phrase sample, the assigning of the identification label not based on the first command phrase sample;
    determining if a command phrase sample threshold is satisfied based on the first command phrase sample and one or more previously detected command phrase samples associated with the identification label;
    in response to determining that the command phrase sample threshold is satisfied, enrolling the user in a speaker identification program;
    identifying the user as a speaker of a second user speech sample using information corresponding to the first command phrase sample and information corresponding to the one or more previously detected command phrase samples, the second user speech sample obtained by a first speaker identification device or a second speaker identification device;
    determining a first proximity of the user to the first speaker identification device and a second proximity of the user to the second speaker identification device;
    comparing the first proximity and the second proximity; and
    causing a closest one of the first speaker identification device or the second speaker identification device to output a response to the second user speech sample based on the comparison of the first proximity and the second proximity.

2. The method of claim 1, wherein the determining that the command phrase sample threshold is satisfied includes determining if the first command phrase sample and the one or more of the previously detected command phrase samples provide at least one minute of speech.

3. The method of claim 1, wherein the determining that the command phrase sample threshold is satisfied includes determining if the first command phrase sample and the one or more previously detected command phrase samples include at least twenty command phrase samples.

4. The method of claim 1, wherein the user is a first user and further including:
    parsing a third user speech sample associated with a second user into a second wake phrase sample and a second command phrase sample;
    determining if the command phrase sample threshold is satisfied based on the second command phrase sample and one or more previously detected command phrase samples associated with the second user; and
    in response to determining that the command phrase sample threshold is satisfied, enrolling the second user in the speaker identification program.

5. A speaker identification device comprising:
    a speech parsing circuit to parse a first user speech sample associated with a user into a first keyword phrase sample and a first command phrase sample;
    a command phrase list add circuit to assign an identification label to the first command phrase sample based on [[the]] an identification of the user based on information, the information based on the first keyword phrase sample, the assigning of the identification label by the command phrase list add circuit not based on the first command phrase sample;
a text-independent enrollment circuit to:
  determine if a command phrase sample threshold is satisfied based on the first command phrase sample and one or more previously detected command phrase samples associated with the identification label;
  in response to determining that the command phrase sample threshold is satisfied, enroll the user in a text-independent speaker identification program;
a delivery circuit; and
a text-independent speaker identification circuit to:
  identify the user as a speaker of a second user speech sample based on information corresponding to the first command phrase sample and information corresponding to one or more previously detected command phrase samples;
  determine a first proximity of the user to the speaker identification device and a second proximity of the user to a second speaker identification device;
  perform a comparison of the first proximity and the second proximity; and
  instruct a closest one of the delivery circuit or the second speaker identification device to output a response to the second user speech sample based on the comparison of the first proximity and the second proximity.

6. The speaker identification device of claim 5, wherein the text-independent enrollment circuit is to determine that the command phrase sample threshold is satisfied if the first command phrase sample and the one or more previously detected command phrase samples provide at least one minute of speech.

7. The speaker identification device of claim 5, wherein the text-independent enrollment circuit is to determine that the command phrase sample threshold is satisfied in response to the first command phrase sample and the one or more previously detected command phrase samples including at least twenty command phrase samples.

8. The speaker identification device of claim 5, further including a text-dependent enrollment circuit to enroll the user in a text-dependent speaker identification program using one or more samples of a keyword phrase from the user.

9. The speaker identification device of claim 5, wherein:
the user is a first user; and
the text-independent enrollment circuit is to:
  determine if the command phrase sample threshold is satisfied based on a second command phrase sample associated with a second user and one or more previously detected command phrase samples associated with the second user; and
  in response to determining that the command phrase sample threshold is satisfied, enroll the second user in the text-independent speaker identification program.

10. One or more machine-readable memories comprising instructions that, when executed by one or more processors, cause the one or more processors to at least:
parse a first user speech sample associated with a user into a first keyword phrase sample and a first command phrase sample;
assign an identification label to the first command phrase sample based on an identification of the user, the identification of the user using information based on the first keyword phrase sample, the assigning of the identification label not based on the first command phrase sample;
determine if a command phrase sample threshold is satisfied based on the first command phrase sample and one or more previously detected command phrase samples associated with the identification label;
in response to determining that the command phrase sample threshold is satisfied, enroll the user in a speaker identification program;
identify the user as a speaker of a second user speech sample using information associated with the first command phrase sample and information associated with the one or more previously detected command phrase samples, the second user speech sample obtained by one of a first speaker identification device or a second speaker identification device;
determine a first proximity of the user to the first speaker identification device and a second proximity of the user to the second speaker identification device;
perform a comparison of the first proximity and the second proximity; and
cause a closest one of the one of the first speaker identification device or the second speaker identification device to output a response to the second user speech sample based on the comparison of the first proximity and the second proximity.

11. The one or more machine-readable memories of claim 10, wherein the instructions, when executed, cause the one or more processors to determine that the command phrase sample threshold is satisfied if the first command phrase sample and the one or more previously detected command phrase samples provide at least one minute of speech.

12. The one or more machine-readable memories of claim 10, wherein the instructions, when executed, cause the one or more processors to determine that the command phrase sample threshold is satisfied in response to the first command phrase sample and the one or more previously detected command phrase samples including at least twenty command phrase samples.

13. The one or more machine-readable memories of claim 10, wherein the user is a first user, and the instructions, when executed, cause the one or more processors to:
determine if the command phrase sample threshold is satisfied based on a second command phrase sample associated with a second user and one or more previously detected command phrase samples associated with the second user; and
in response to determining that the command phrase sample threshold is satisfied, enroll the second user in the speaker identification program.

14. An apparatus comprising:
at least one memory;
instructions in the apparatus; and
processor circuitry to execute the instructions to:
  parse a first user speech sample associated with a user into a first keyword phrase sample and a first command phrase sample;
  assign an identification label to the first command phrase sample based on an identification of the user, the identification of the user using information based on the first keyword phrase sample, the assigning of the identification label not based on the first command phrase sample;
  determine if a command phrase sample threshold is satisfied based on the first command phrase sample and one or more previously detected command phrase samples associated with the identification label;

in response to determining that the command phrase sample threshold is satisfied, enroll the user in a speaker identification program;

identify the user as a speaker of a second user speech sample using information associated with the first command phrase sample and information associated with the one or more previously detected command phrase samples, the second user speech sample obtained by one of a first speaker identification device or a second speaker identification device;

determine a first proximity of the user to the first speaker identification device and a second proximity of the user to the second speaker identification device;

perform a comparison of the first proximity and the second proximity; and cause a closest one of the one of the first speaker identification device or the second speaker identification device to output a response to the second user speech sample based on the comparison of the first proximity and the second proximity.

15. The apparatus of claim 14, wherein the processor circuitry is to determine that the command phrase sample threshold is satisfied if the first command phrase sample and the one or more previously detected command phrase samples provide at least one minute of speech.

16. The apparatus of claim 14, wherein the processor circuitry is to determine that the command phrase sample threshold is satisfied in response to the first command phrase sample and the one or more previously detected command phrase samples including at least twenty command phrase samples.

17. The apparatus of claim 14, wherein the user is a first user, and the processor circuitry is to:

determine if the command phrase sample threshold is satisfied based on a second command phrase sample associated with a second user and one or more previously detected command phrase samples associated with the second user; and in response to determining that the command phrase sample threshold is satisfied, enroll the second user in the speaker identification program.

* * * * *

UNITED STATES PATENT AND TRADEMARK OFFICE
CERTIFICATE OF CORRECTION

PATENT NO. : 11,276,408 B2
APPLICATION NO. : 16/356011
DATED : March 15, 2022
INVENTOR(S) : David Pearce It is certified that error appears in the above-identified patent and that said Letters Patent is hereby corrected as shown below:

In the Claims

Column 20, Line 67 (Claim 5):
Delete "[[the]]".

Signed and Sealed this
Eighth Day of November, 2022

Katherine Kelly Vidal
*Director of the United States Patent and Trademark Office*